(12) United States Patent
Absillis et al.

(10) Patent No.: US 7,826,378 B2
(45) Date of Patent: Nov. 2, 2010

(54) PON WITH DISTRIBUTED VIRTUAL PORT LOOPBACK

(75) Inventors: Luc Absillis, Raleigh, NC (US); Charles Storry, Kemptville, CA (US)

(73) Assignee: Alcatel Lucent, Paris (FR)

( * ) Notice: Subject to any disclaimer, the term of this patent is extended or adjusted under 35 U.S.C. 154(b) by 608 days.

(21) Appl. No.: 11/689,834

(22) Filed: Mar. 22, 2007

(65) Prior Publication Data

US 2008/0232794 A1  Sep. 25, 2008

(51) Int. Cl.
*H04J 3/14* (2006.01)
(52) U.S. Cl. ....................... 370/241; 370/247
(58) Field of Classification Search ........................ None
See application file for complete search history.

(56) References Cited

U.S. PATENT DOCUMENTS

| | | | | |
|---|---|---|---|---|
| 5,361,293 A | * | 11/1994 | Czerwiec | 379/27.02 |
| 5,680,391 A | * | 10/1997 | Barron et al. | 370/241 |
| 2005/0198272 A1 | * | 9/2005 | Bernard et al. | 709/224 |
| 2006/0198634 A1 | * | 9/2006 | Ofalt et al. | 398/16 |
| 2007/0242954 A1 | * | 10/2007 | Sackman | 398/71 |
| 2008/0212744 A1 | * | 9/2008 | Wurst et al. | 379/27.01 |
| 2008/0232804 A1 | * | 9/2008 | Absillis | 398/71 |
| 2009/0252494 A1 | * | 10/2009 | Capurso et al. | 398/58 |

* cited by examiner

*Primary Examiner*—Phuc Tran
(74) *Attorney, Agent, or Firm*—Capital Patent & Trademark Law Firm, PLLC (57) ABSTRACT

A passive optical network (PON) access network connected to an external data network can be tested using a remote test host operating on the external data network by looping test data from the test host through the PON to an Optical Network Terminator (ONT), through a data path between an ONT test port and an ONT user port, and back through the PON to the test host. Data tunneling is used to route the data through the external data network between the test host and the PON Optical Line Terminal (OLT). The invention can be used to emulate downstream as well as upstream PON traffic for remote diagnostic testing or other purposes.

11 Claims, 9 Drawing Sheets

PON WITH DISTRIBUTED VIRTUAL PORT LOOPBACK

BACKGROUND OF THE INVENTION

1. Field of the Invention

The present invention relates generally to passive optical networks (PONs) and, more specifically, to providing a self-test mechanism in a PON.

2. Description of the Related Art

The passive optical network (PON) is increasingly gaining acceptance as an access network for delivering broadband services such as Internet access, digital television and telephone service, to residential and business subscribers (i.e., customers of the service provider). The essence of a PON is that nothing but optical fiber and passive components are found in the path between the central office and subscribers. A single fiber can run from the central office to a passive splitter located near a group of subscribers, such as a neighborhood or office complex, and individual fibers can run from the splitter to individual subscribers or sub-groups of subscribers. The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification sometimes referred to as "broadband PON" (BPON), and G984.x, a specification sometimes referred to as "gigabit PON" (GPON). The IEEE has also adopted Ethernet-based (i.e., IEEE 802.3-based) PON standards referred to as "Ethernet PON" (EPON) and "gigabit EPON" (GEPON). These standards and recommendations are well known to persons skilled in the art to which the invention relates and are therefore not described in further detail in this patent specification. Although the term GPON may be used herein for convenience with regard to embodiments of the present invention described below, the invention can be applied to any suitable PON technology.

Figure 1:
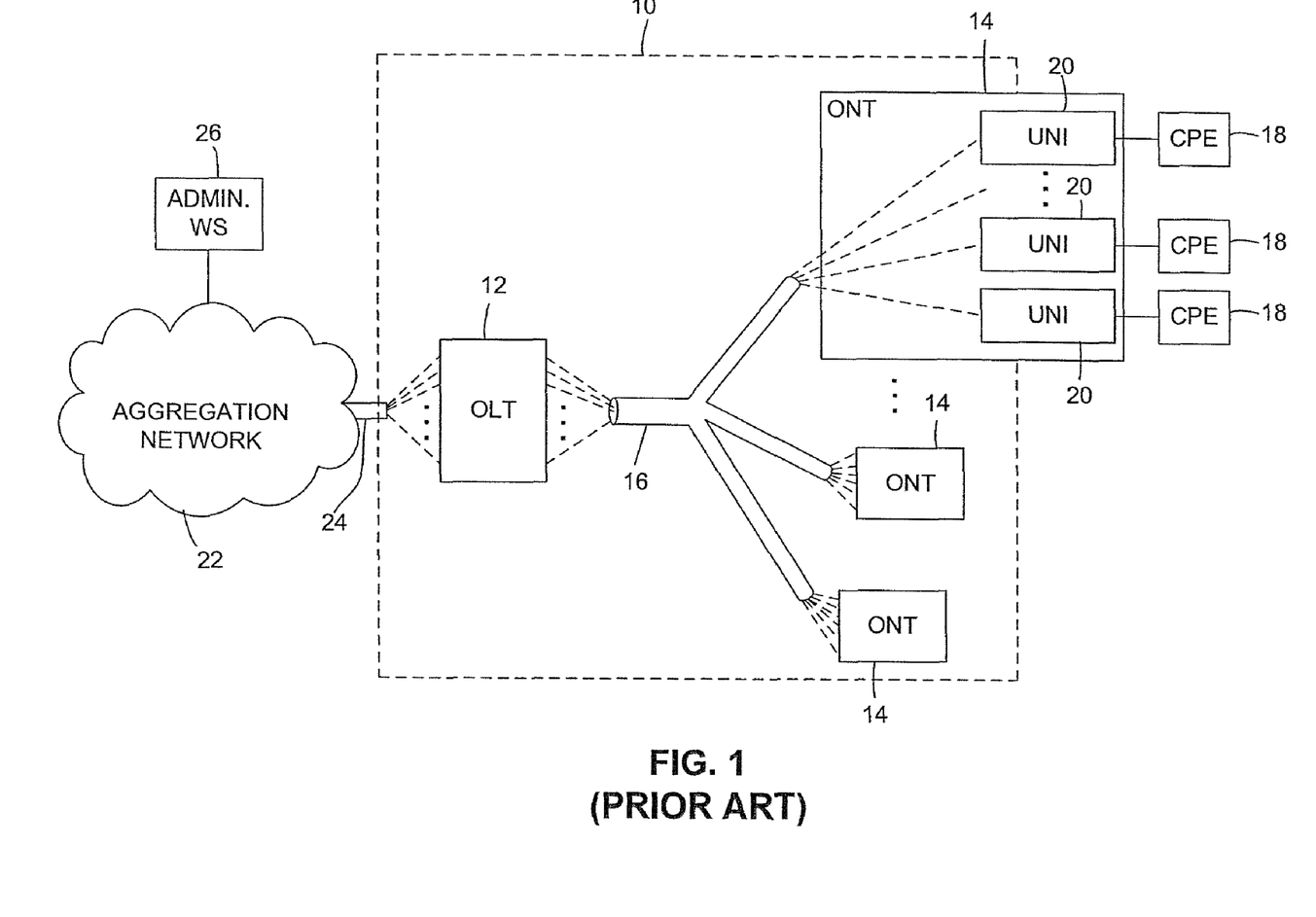
FIG. 1 is a block diagram of a prior art network.

As illustrated in FIG. 1, in a conventional arrangement for delivering services to subscribers, a PON 10 includes an Optical Line Terminal (OLT) 12 (also known as optical line terminator) optically coupled to a number of Optical Network Terminators (ONTs) 14 (also known as optical network terminals and optical network units) by an arrangement of optical fibers 16 that includes one or more optical splitters (not separately shown for purposes of clarity). Each ONT 14 can be connected to various customer premises equipment (CPE) 18, such as a residential local area network (LAN) router, telephone, television, etc.

In the downstream direction, i.e., data transmitted from OLT 12 (e.g., located at the central office) to an ONT 14 (e.g., located at a subscriber's premises), the data packets are broadcast from OLT 12 to all of ONTs 14, and an ONT 14 can select the data to receive by matching the address embedded in the data packets to a previously provisioned or learned address. In other words, an ONT 14 only "listens" to data packets having a matching address. Thus, OLT 12 can transmit data "downstream" to a particular or selected ONT 14 by addressing it to that ONT. In the "upstream" direction, i.e., data transmitted from an ONT 14 to OLT 12, the data packets are time-domain multiplexed. In GPON, the downstream address typically comprises both a conventional Ethernet Media Access Control (MAC) address as well as a GPON Encapsulation Method (GEM) Port-ID. The GEM Port-ID can be used as a Quality-of-Service (QoS) designator to address a priority queue on a particular ONT user-network interface (UNI) 20 (port), to which a CPE 18 is connected.

Quality of Service (QoS) is, generally speaking, a term that refers to assigning data packets different priorities based upon the type of data they carry. For example, real-time streaming video (i.e., digital television) service and audio (e.g., telephone or music service) are generally assigned higher priorities than Internet Web browsing and e-mail. In this manner, demands placed upon the network by multiple subscribers simultaneously requesting different services are less likely to diminish any subscriber's individual perception of service quality. QoS differentiation is an important feature of GPON systems, as the primary QoS designator, the GEM Port-ID, is generally used to define the virtual or logical data communication paths between OLT 12 and the ONT UNIs 20. The dashed lines at the ends of fibers 16 in FIG. 1 conceptually illustrate this potential multiplicity of PON virtual paths.

The structure of an exemplary one of ONTs 14 is shown in FIG. 1, illustrating how each virtual path can be used for data communication via one of UNIs 20, to which CPE 18 such as a LAN router, telephone, television, etc., can be connected. The structure of only one ONT 14 is shown for purposes of clarity, but the others can have the same or a similar structure.

The PON 10 serves as an access network through which subscribers can access services provided by the service provider's aggregation network 22. Aggregation network 22 is typically an Ethernet-based network that employs virtual LANs (VLANs), conceptually indicated in FIG. 1 by the dashed lines at the ends of the Ethernet cable or other communication medium 24 connecting to OLT 12. One conventional function of OLT 12 is to cross-connect the VLANs with the PON virtual paths. A VLAN is an example of a principle known as tunneling. Tunneling refers to the transmission of data intended for restricted or private use within a network in such a way that the network routing nodes are unaware that the transmission is part of the restricted network.

The service provider commonly includes an administrative workstation 26 for performing operations, administration and management (OAM) functions, such as provisioning and troubleshooting ONTs 14 and CPE 18. Sometimes, a subscriber will contact the service provider to report a problem. The service provider's ability to perform provisioning and troubleshooting is limited by the service provider's access to the subscriber end of the network. In some cases, service personnel attempting to verify provisioning or troubleshoot a reported problem would be aided by connecting test equipment directly to the ONT 14 or CPE 18 at the subscriber premises. However, dispatching service personnel to the subscriber premises (which service providers sometimes refer to as a "truck roll") is uneconomical and time-consuming. Accordingly, it is desirable to enable a service provider to perform as much testing as possible from a remote location, such as administrative workstation 26. The present invention addresses these problems and deficiencies and others in the manner described below.

SUMMARY OF THE INVENTION

The present invention relates to testing a passive optical network (PON) access network having an Optical Line Terminal (OLT) and a plurality of Optical Network Terminators (ONTs) and connected to a service provider's data network by looping test data from the data network back to the data network through a data network tunnel and a virtual or logical data communication path through an ONT. The invention thus involves both a logical loopback path in the ONT and a tunnel in the data network. The OLT can include the tunneling logic that transparently exchanges data between it and the test host through the data network. The invention can be used to emulate downstream as well as upstream PON traffic for remote diagnostic testing or other purposes.

In accordance with an exemplary embodiment of the invention, a data communication tunnel is established in the data network between the OLT and a test host operating on the data network. A first data communication path is established in the PON between the OLT and a logical test port of an ONT. The logical test port is not associated with any physical user port of the ONT but rather is dedicated to the loopback testing of the present invention. The logical test port can be defined, for example, by a dedicated or reserved GEM Port-ID. A test host operating on the data network can use the logical test port to transmit test data to an ONT logical user port or, alternatively, to receive data from an ONT logical user port. The logical user port is associated with a physical user port of the ONT. A second data communication path is established in the PON between the OLT and the ONT logical user port. A third data communication path is established in the ONT between the logical test port and the logical user port, thereby providing a loopback path.

Accordingly, test data that the test host sends through the PON (via the OLT and fiber network) to an ONT logical user port is looped back through the PON via the ONT logical test port and received (again, via the fiber network and the OLT) at the test host. Alternatively, test data that the test host sends through the PON (via the OLT and fiber network) to an ONT logical test port is looped back through the PON via the ONT logical user port and received (via the fiber network and the OLT) at the test host.

The tunnel and first, second and third data paths can exist simultaneously or, alternatively, one can be established and de-established before another is established. A data path can be established as part of a data transmitting step or, alternatively, as an independent step.

Service personnel can use the above-described system and method to emulate the customer or subscriber end of the network to, for example, attempt to reproduce problems that a customer may have reported experiencing. Service personnel can directly connect the test host to any of the same types of customer premises equipment (CPE), such as residential network routers, telephones, televisions, etc., that may be connected to the ONT at the customer's premises. Thus, they can send test data from the test host to an ONT logical user port, and the data received at the test host via the loopback path can be input to the customer premises equipment to attempt to remotely reproduce the customer experience. For example, to emulate or test a file transfer function that would normally be initiated by a CPE, the test host can send a file transfer request through the tunnel, the OLT and portions of the PON to the ONT logical test port, where the request is looped back onto the ONT logical user port, then back through portions of the PON to the OLT and back through the tunnel to a fileserver in the service provider's data network. The fileserver's response (e.g., data representing a requested file) is sent through the tunnel, the OLT and portions of the PON to the ONT logical user port, where the response is looped back onto the ONT logical test port, then back through portions of the PON to the OLT and back through the tunnel to the test host. In such an instance, both the file transfer request and the fileserver's response constitute examples of "test data" as that term is used herein.

DETAILED DESCRIPTION

Figure 2:
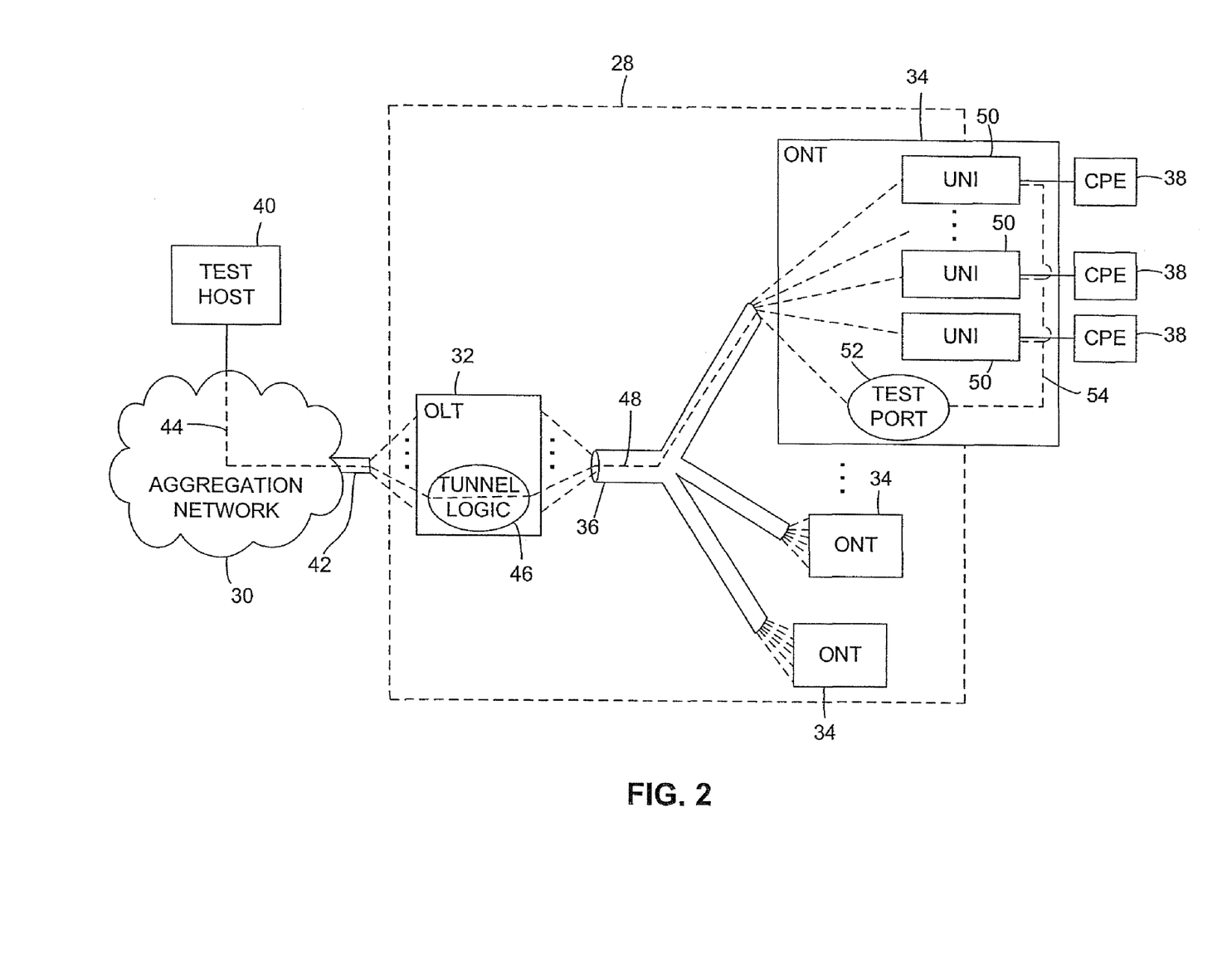
FIG. 2 is a block diagram of a network in accordance with an exemplary embodiment of the present invention.

As illustrated in FIG. 2, in an exemplary embodiment of the invention, an extended network for delivering services such as voice, video and Internet access to subscribers comprises a passive optical network (PON) 28 and a data aggregation network 30. The PON 28 includes an Optical Line Terminal (OLT) 32 and a number of Optical Network Terminators (ONTs) 34. (The ellipsis symbol (" . . . ") is intended to indicate that, although only three ONTs 34 are shown for purposes of clarity, PON 28 can include any suitable number of ONTs.) The OLT 32 is optically coupled to each ONT 34 by an optical fiber network portion 36 that includes one or more optical splitters (not separately shown for purposes of clarity). The OLT 32 can be located at, for example, an exchange or central office from which the service provider provides services such as voice, video and Internet access (so-called "triple-play" service). The ONTs 34 can be located at or near the businesses, residences or other premises occupied by subscribers to such services. Also located at or near such premises are any of various items of customer premises equipment 38, such as home network routers, telephones, televisions, etc., through which subscribers experience the services.

A test host 40 is connected to aggregation network 30. The service provider can operate test host 40 in the manner described below to test whether PON 28 is functioning properly and to perform conventional operations, administration and management operations. Note that aggregation network 30 is coupled to OLT 32 by a suitable communication medium 42, such as one or more Ethernet cables, and that such a communication medium 42 is capable of carrying a number of virtual local area networks (VLANs) or other logical paths, conceptually indicated by the dashed lines at the end of communication medium 42 connecting to OLT 32. As described in further detail below, in accordance with the invention, test host 40 communicates with OLT 32 via a suitable data tunnel 44, which can comprise such a VLAN or, alternatively, a multi-protocol label-switching (MPLS) tunnel or any other suitable type of data communication tunnel that enables OLT 32 to exchange data with test host 40 in a manner transparent to aggregation network 30. The OLT 32 includes tunnel logic 46, under the control of which OLT 32 performs the tunneling method. As suitable tunneling methods are well known to persons skilled in the art to which the invention relates, they are not described in this patent specification ("herein"). Some common encapsulation methods include encapsulating packets for transmission in one direction (e.g., from OLT 32 to test host 40) and de-encapsulating data packets for transmission in the opposite direction (e.g., from test host 40 to OLT 32).

As described in further detail below, tunnel logic 46 causes OLT 32 to cross-connect tunnel 44 to a logical data communication path 48 in PON 28. Logical data communication path 48 can be defined by a GPON Encapsulation Method (GEM) Port-ID in embodiments of the invention that are in accordance with the GPON standard, by a Virtual Path Identifier (VPI) or Virtual Channel Identifier (VCI) in embodiments of the invention that are in accordance with the BPON standard, or by any other suitable designator or other means. The various logical data communication paths that can be defined using GEM Port-IDs or other such designators are conceptually indicated in FIG. 2 by the dashed lines at the ends of optical fiber network portion 36.

For purposes of clarity, only one of ONTs 34 is shown in detail in FIG. 2, but the others can have the same structure. The ONT 34 includes a number of conventional user ports or user-network interfaces (UNIs) 50, each of which represents both the physical user port to which CPE 38 is connectable and the corresponding or associated logical user port that is recognized by remote network devices (e.g., test host 40) communicating with UNI 50. For example, a remote network device can address each logical UNI by a unique corresponding GEM Port-ID. In accordance with the present invention, ONT 34 further includes a virtual or logical test port 52. Logical test port 52 does not have any corresponding or associated physical port but rather is established solely for the purpose of enabling the loopback methods of the present invention. Logical test port 52 otherwise behaves in the same manner as any logical port with regard to sending and receiving data via PON 28.

As described in further detail below, an additional logical data communication path 54 can be established between logical test port 52 and any selected one of UNIs 50. When such a path is established, the physical user port of the selected UNI 50 disables the data communication between it and any connected CPE 38. Test host 40 can select one of UNIs 50 and thereby cause this additional logical data communication path 54 to be established by, for example, sending a suitable control plane message to ONT 34.

Figure 3:
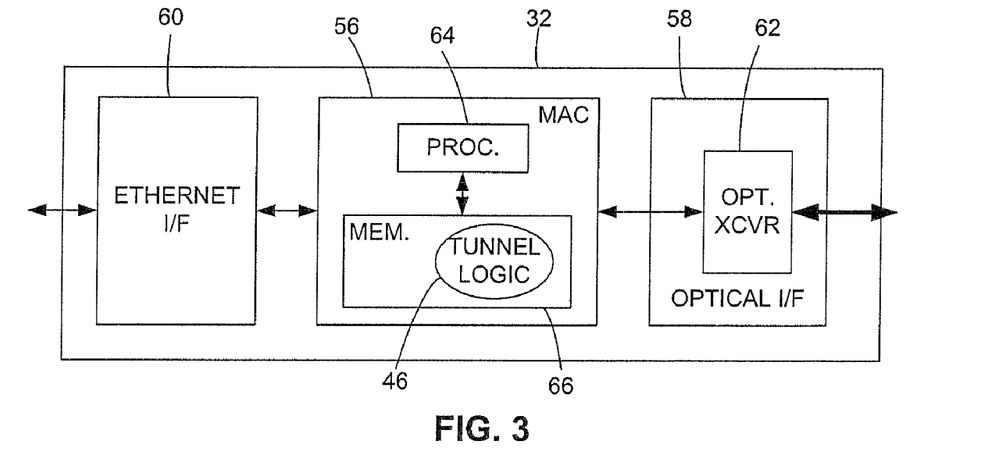
FIG. 3 is a block diagram of an exemplary OLT shown in FIG. 2.

As illustrated in FIG. 3, OLT 32 comprises a media access controller (MAC) 56, a line terminator card or other optical interface 58, and an Ethernet terminator card or similar Ethernet interface 60. Ethernet interface 60 is the physical interface between OLT 32 and aggregation network 30 (FIG. 2). Similarly, optical interface 58 is the physical interface between OLT 32 and optical fiber network portion 36. Accordingly, optical interface 58 includes an opto-electronic transceiver 62, as well as other elements (not shown for purposes of clarity) of the type generally included in such OLT optical interfaces. As the general manner in which an OLT transmits, receives and otherwise processes GPON packets is well known in the art, it is not described herein. As in the MAC of conventional OLTs, MAC 56 performs the bulk of the processing required to deliver the services requested through ONTs 34. In addition to the novel features and functions described below, MAC 56 can include any features of conventional MACs and can perform any suitable conventional functions.

In the exemplary embodiment of the invention, MAC 56 includes a processor 64 and associated memory 66 that together define a processor system of a type in which processor 64 operates under software control. However, in other embodiments the OLT processor system can include any other suitable elements, such as programmable or hard-wired logic devices, firmware logic, software logic, application-specific integrated circuit logic, etc., in addition to or instead of the illustrated elements, that allow the processor system to be programmed or otherwise configured to perform the functions described below as well as functions performed by a conventional OLT MAC. In the illustrated embodiment, tunnel logic 46 is shown for purposes of illustration as conceptually stored in or residing in memory 66, with the processor system operating under control of such software elements and thus performing or causing to be performed the functions described in further detail below. However, as persons skilled in the art to which the invention relates can appreciate, such software elements may not actually reside in memory 66 simultaneously or in their entireties; rather, portions thereof may be retrieved to memory 66 and executed on an as-needed basis in the conventional manner. Other software elements of the types under which a conventional MAC is controlled are not shown for purposes of clarity. It should be noted that it is the operation of the processor system, under control of tunnel logic 46, that gives rise to the tunneling function illustrated in FIG. 2.

Figure 4:
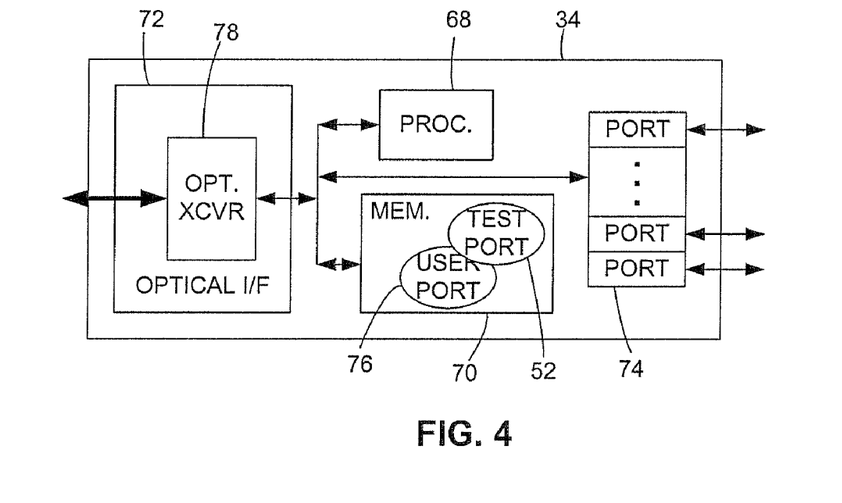
FIG. 4 is a block diagram of an exemplary ONT shown in FIG. 2.

As illustrated in FIG. 4, each ONT 34 comprises a processor 68 and associated memory 70 that together define a processor system of a type in which processor 68 operates under software control. ONT 34 further comprises an optical interface 72 and the UNI physical interface 74. Optical interface 72 is the physical interface between ONT 34 and optical fiber network portion 36 (FIG. 2) and accordingly includes an opto-electronic transceiver 78 and other elements (not shown for purposes of clarity) of the type generally included in such ONT optical interfaces. The UNI physical interface 74 is the physical device (i.e., comprising data communications hardware such as driver circuitry, buffer logic, connectors, etc.) to which one or more CPE 38 can be connected (FIG. 2). Accordingly, UNI physical interface 74 comprises a number of physical ports to which a corresponding number of CPE 38 can be connected. Note that each UNI 50 in FIG. 2, in accordance with the manner in which the term "user-network interface" (UNI) is commonly used in the art, comprises the combination of a physical port of interface 74 and a logical user port 76, which is conceptually shown for purposes of illustration as residing in memory 70 to be used in conjunction with processor 68.

Although in the exemplary embodiment of the invention, the ONT processor system includes processor 68 and associated memory 70, in other embodiments the ONT processor system can include any other suitable elements, such as programmable or hard-wired logic devices, firmware, software, application-specific integrated circuit logic, etc., in addition to or in place of the illustrated elements, that allow the processor system to be programmed or otherwise configured to perform the functions described below. In the exemplary embodiment, logical user port 76 and logical test port 52 and other software elements are shown for purposes of illustration as conceptually stored in or residing in memory 70, with the processor system operating under control of such software elements and thus performing or causing to be performed the functions that they define. However, as persons skilled in the art to which the invention relates can appreciate, such software elements may not actually reside in memory 70 simultaneously or in their entireties; rather, portions thereof may be retrieved to memory 70 and executed on an as-needed basis in the conventional manner. The functions of logical test port 52 and logical user 76 are described below in further detail with regard to methods of operation of the system. It should be noted that it is the operation of the processor system under control of such software elements that gives rise to the logical test port function illustrated in FIG. 2 and the logical user port function of UNIs 50.

Figure 5:
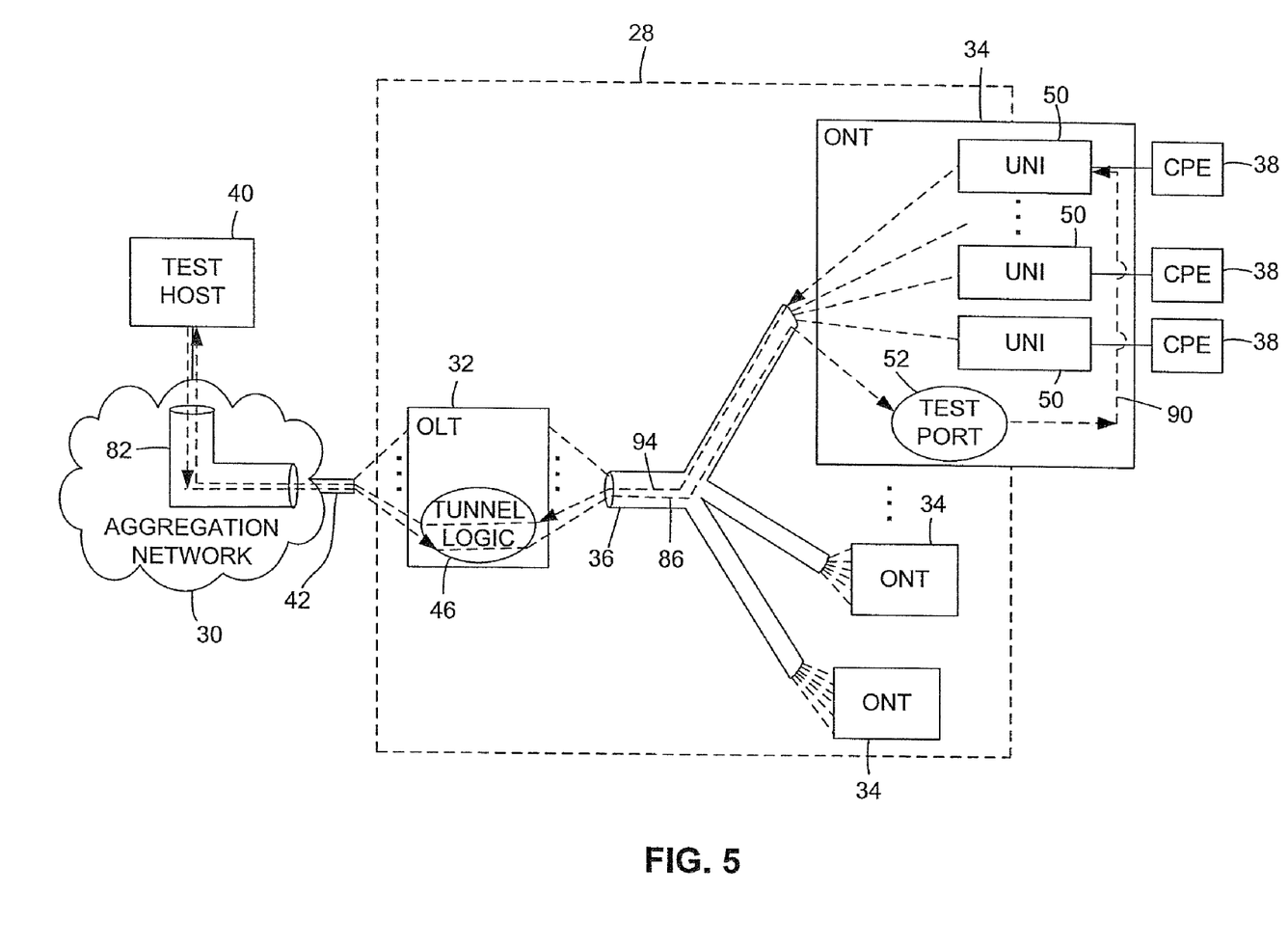
FIG. 5 is a block diagram similar to FIG. 2, illustrating an exemplary loopback arrangement for emulating upstream PON traffic.
Figure 6:
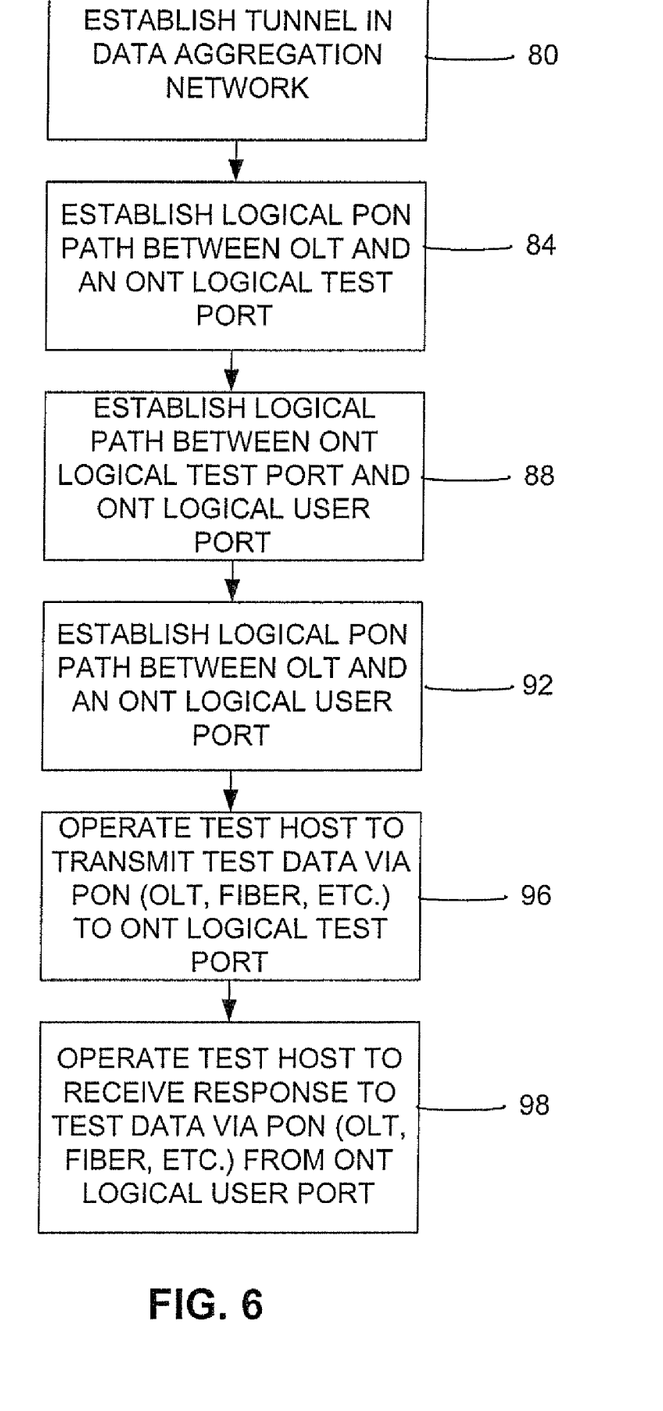
FIG. 6 is a flow diagram, illustrating an exemplary loopback testing method using the arrangement of FIG. 5.

With reference to FIGS. 5 and 6, an exemplary loopback testing method can be used to transmit test data from test host 40 through aggregation network 30 and PON 28 to a selected interface of a selected ONT 34, which loops the data back so that test host 40 can receive the response to the test data. In most instances, if PON 28 and the selected ONT 34 are functioning properly, and the selected ONT 34 has been properly provisioned, the data that is returned in response to the transmitted test data should be identical to the transmitted test data. In such instances, any differences between the transmitted data and response data would be indicative of network or provisioning problems.

As indicated by step 80, OLT 32 establishes a data communication tunnel 82 in data aggregation network 30. This step can be initiated by test host 40 at the time a test is to be initiated or, alternatively, it can be pre-established or established at any other suitable time by any other suitable means. As described above, the tunnel can be, for example, a VLAN. The step of establishing a data communication tunnel can be as straightforward as defining, acknowledging or using a dedicated VLAN address or, in other embodiments, can be more complex and involve multiple sub-steps.

As indicated by step 84, OLT 32 establishes another data communication path 86 between itself and logical test port 52. This step can comprise, for example, OLT 32 addressing data packets to logical test port 52 by its corresponding GEM Port-ID. As described above, logical test port 52 is similar to the logical portion of each UNI 50 but does not have any corresponding physical port.

As indicated by step 88, the ONT 34 to which the data packets are directed establishes yet another data communication path 90 between the selected UNI 50 and logical test port 52. As described above, ONT 34 can establish this loopback path in response to a control plane message initiated by test host 40 or by any other suitable means. When this path is active, the physical interface between UNI 50 and any connected CPE 38 is disabled so as not to interfere with the testing. With reference to FIG. 4, it can be noted that in the exemplary embodiment of the invention it is the operation of processor 68, transferring data packets to the selected UNI 50 under control of logical test port 52 (i.e., a software element), that defines or gives rise to this path; there is no hardware switch or other dedicated physical connection. Other embodiments, however, can use any other suitable means for establishing such a loopback path.

As indicated by step 92, the ONT 34 can establish another data communication path 94 between the selected UNI 50 and OLT 32. This step can comprise, for example, ONT 34 transmitting the data packets in the same manner in which a conventional ONT transmits upstream packets. Note that the three above-described paths and tunnel can be established (and de-established) at any suitable time, in any suitable order, and in any suitable manner, and the above-described steps are intended only to be exemplary. For example, communication path 94 can be one that has been established earlier to allow communication between the aggregation network 30 and the selected UNI 50.

As noted above, one or more of the paths can be established as part of a step of transmitting the test data itself. As indicated by step 96, test host 40 is operated (e.g., by service personnel) to transmit test data via tunnel 82 to OLT 32, then via data communication path 86 from OLT 32 to logical test port 52 of ONT 34, then via data communication path 90 from logical test port 52 to the selected UNI 50, then back to OLT 32 via data communication path 94 from UNI 50. The OLT 32 then forwards the data back through tunnel 82 to test host 40. As indicated by step 98, test host 40 is operated to receive and evaluate this data. The arrows on the dashed line paths in FIG. 5 indicate the data flow direction in this example, which emulates upstream traffic that would, in normal service, be sent by CPE 38 at the subscriber premises. By examining differences between the test data that was transmitted from test host 40 and the response data that it received in return through the above-described loop, service personnel can determine whether PON 28 is operating properly and whether ONT 34 is properly provisioned.

Figure 7:
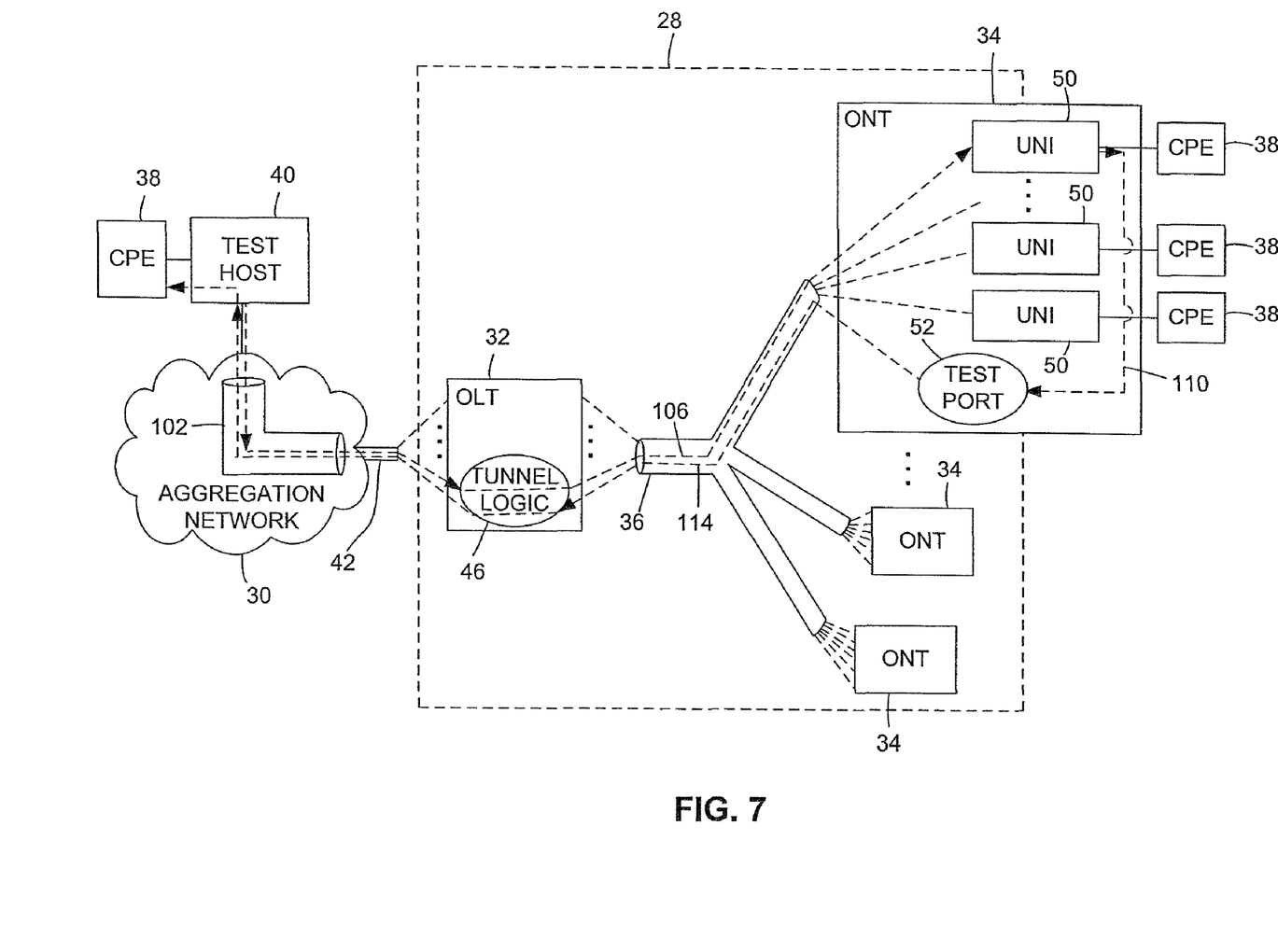
FIG. 7 is a block diagram similar to FIG. 2, illustrating an exemplary loopback arrangement for emulating downstream PON traffic.
Figure 8:
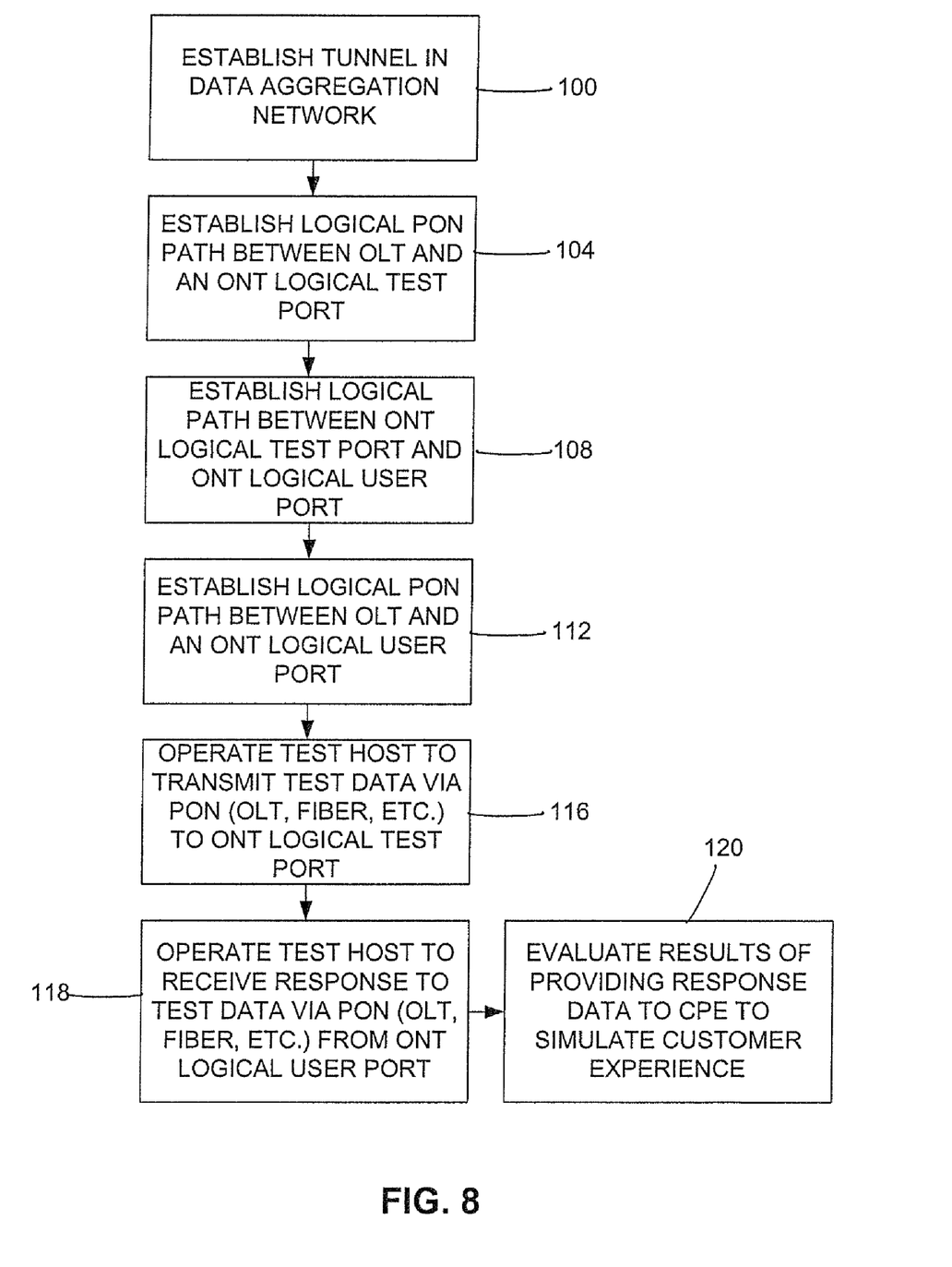
FIG. 8 is a flow diagram, illustrating an exemplary loopback testing method using the arrangement of FIG. 7.

As illustrated in FIGS. 7 and 8, test data can alternatively be looped back in the opposite direction from that illustrated in FIGS. 5 and 6. As indicated by step 100, OLT 32 establishes a data communication tunnel 102 in data aggregation network 30 in the same manner as described above with regard to FIGS. 5 and 6. As indicated by step 104, OLT 32 establishes another data communication path 106 between itself and a selected UNI 50. This step can comprise, for example, OLT 32 addressing data packets to the corresponding logical portion of UNI 50 by its corresponding GEM Port-ID.

As indicated by step 108, the ONT 34 to which the data packets are directed establishes yet another data communication path 110 between the selected UNI 50 and logical test port 52. This step can be performed in the same manner as described above with regard to FIGS. 5 and 6.

As indicated by step 112, the ONT 34 establishes another data communication path 114 between the selected UNI 50 and OLT 32. This step can comprise, for example, ONT 34 transmitting the data packets in the same manner in which a conventional ONT transmits upstream packets.

As indicated by step 116, test host 40 is operated (e.g., by service personnel) to transmit test data via tunnel 82 to OLT 32, then via data communication path 106 from OLT 32 to a selected UNI 50 of ONT 34, then via data communication path 110 from UNI 50 to logical test port 52, then back to OLT 32 via data communication path 114 from logical test port 52. The OLT 32 then forwards the data back through tunnel 102 to test host 40. As indicated by step 118, test host 40 is operated to receive and evaluate this data. The arrows on the dashed line paths in FIG. 7 indicate the data flow direction in this example, which emulates downstream traffic that would, in normal service, be received by CPE 38 at the subscriber premises.

As in the upstream traffic-emulation example described above with regard to FIGS. 5 and 6, by examining differences between the test data that was transmitted from test host 40 and the response data that it received in return through the above-described loop, service personnel can determine whether PON 28 is operating properly and whether ONT 34 is properly provisioned. Additionally, at step 120 the results can be evaluated by applying the response data to customer premises equipment (CPE) 38 that is identical or similar to CPE 38 at the actual customer (subscriber) premises. In this manner, service personnel can attempt to replicate the customer experience. For example, service personnel can attempt to replicate a problem that a customer may have reported in receiving a service, such as telephone service. By connecting a telephone to test host 40, service personnel can conduct tests by using the telephone to communicate via the above-described loopback path.

Figure 9A:
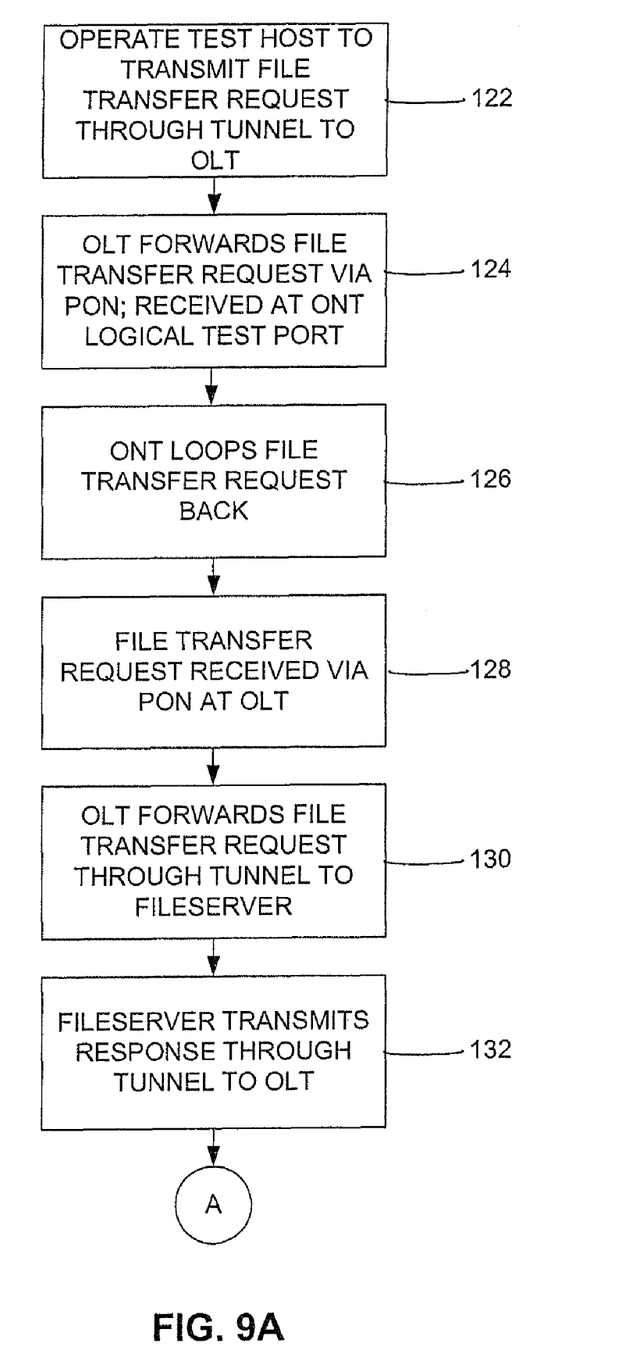
FIG. 9A is a flow diagram, illustrating still another exemplary loopback testing method.
Figure 9B:
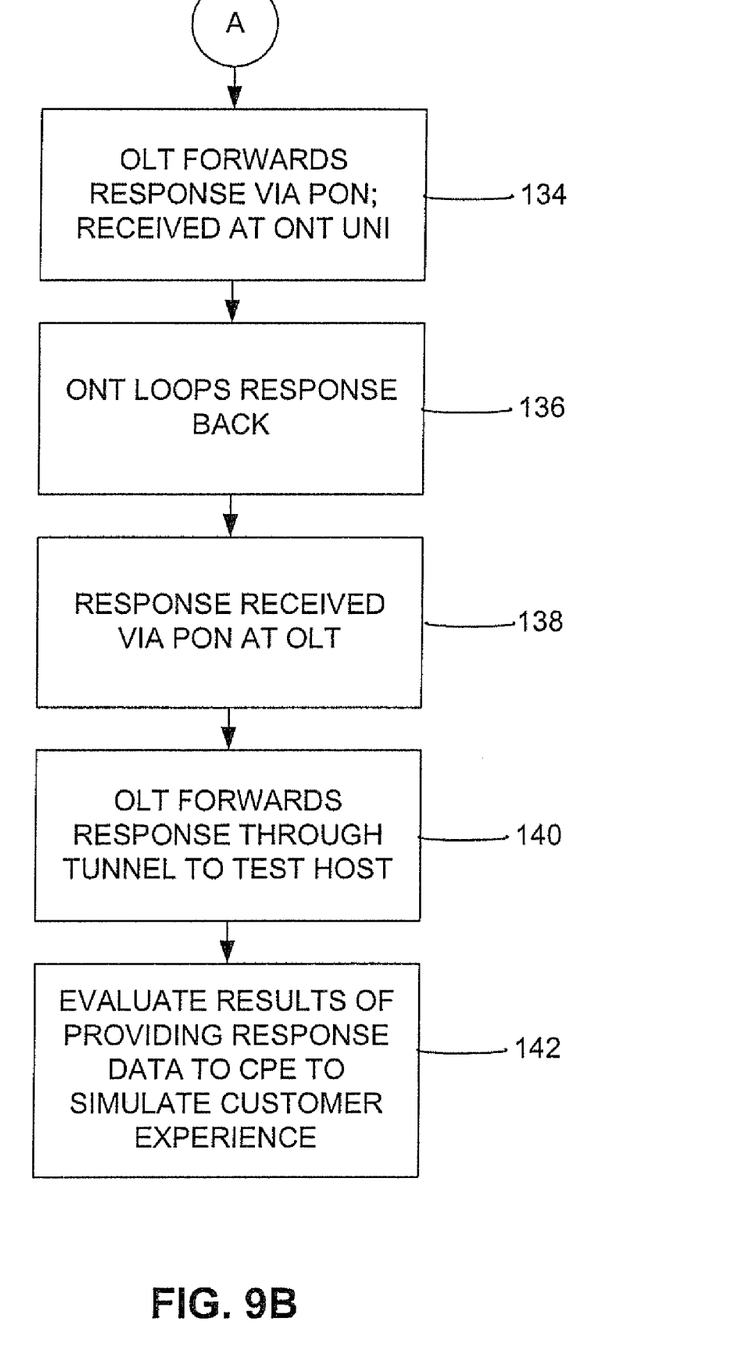
FIG. 9B is a continuation of the flow diagram of FIG. 9A.

As illustrated in FIGS. 9A-B, a more encompassing example, in which a CPE-initiated file transfer function is emulated, combines aspects of the two above-described exemplary test methods. Steps that are the same as in the above-described methods, such as establishing the tunnel and data communication paths through the PON, are not described again for purposes of clarity. At step 122, test host 40 sends a file transfer request through a tunnel in data aggregation network 30 to OLT 32, which forwards it through a data communication path to logical test port 52 at step 124. At step 126, ONT 34 loops the file transfer request back onto the selected UNI 50, from which it is sent back to OLT 32 at step 128. At step 130, OLT 32 forwards the file transfer request through the tunnel to a fileserver (not shown) in data aggregation network 30. At step 132, the fileserver's response (e.g., data representing a requested file) is sent through the tunnel to OLT 32, which forwards it through a data communication path to the selected UNI 50 at step 134. At step 136, ONT 34 loops the response back onto logical test port 52, from which it is sent back to OLT 32 at step 138. At step 140, OLT 32 forwards the response through the tunnel to test host 40. As described above with regard to other exemplary test methods, test host 40 can apply the response data to associated CPE 38 that is identical or similar to CPE 38 at the actual customer (subscriber) premises to simulate the customer experience.

As illustrated by the above-described examples, the invention can emulate downstream as well as upstream PON traffic for diagnostic testing or other purposes. In emulating downstream traffic that would otherwise be received by the ONT and customer premises equipment (which is disconnected for test purposes), test data is sent to a selected ONT UNI port and looped back through the PON via a similar but virtual or logical (i.e., non-physical) "test" port. In emulating upstream traffic that would otherwise be transmitted by customer premises equipment or the ONT, test data is sent to the test port and looped back through the PON via a selected ONT UNI port. It should be noted that establishing a tunnel with the test host is significant because, absent such a feature, the data network would, in accordance with Ethernet conventions, simply re-route upstream packets back downstream to the ONT from which they came, as indicated by their destination MAC address, and the packets would never be properly routed to the test host.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for testing a passive optical network (PON) having an Optical Line Terminal (OLT) and a plurality of Optical Network Terminators (ONTs), comprising:
   establishing a data communication tunnel in a data network between the OLT and a test host operating on the data network;
   establishing a first data communication path in the PON between the OLT and a logical test port of an ONT, the logical test port not associated with any physical user port of the ONT;
   establishing a second data communication path in the PON between the OLT and a logical user port of the ONT, the logical user port associated with a physical user port of the ONT;
   establishing a third data communication path in the ONT between the logical test port and the logical user port; and
   operating the test host to transmit and receive test data via a loopback test path comprising the data communication tunnel and the first, second and third data communication paths.

2. The method claimed in claim 1, wherein the step of operating the test host comprises:
   transmitting the test data to the logical user port of the ONT; and
   receiving data from the logical test port of the ONT in response to the test data.

3. The method claimed in claim 1, wherein the step of operating the test host comprises:
   transmitting the test data to the logical test port of the ONT; and
   receiving data from the logical user port of the ONT in response to the test data.

4. The method claimed in claim 3, wherein the step of transmitting the test data to the logical test port of the ONT comprises addressing the logical test port by a corresponding Gigabit PON (GPON) Encapsulation Method (GEM) Port Identifier (GEM Port-ID).

5. The method claimed in claim 3, wherein the step of receiving data from the logical user port of the ONT in response to the test data comprises:
   connecting customer premises equipment (CPE) to the test host; and
   evaluating data received at the CPE from the logical user port of the ONT.

6. The method claimed in claim 1, wherein the step of establishing a data communication tunnel comprises establishing a virtual local area network (VLAN).

7. The method claimed in claim 1, wherein the step of establishing a data communication tunnel comprises performing multi-protocol label-switching (MPLS).

8. A passive optical network (PON), comprising:
   an Optical Line Terminal (OLT) providing a data communication tunnel in an external data network between the OLT and a test host operating on the external data network; and
   an Optical Network Terminator (ONT) coupled to the OLT and having a plurality of physical user ports for connecting customer premises equipment, each physical user port accessible as a corresponding logical user port to the test host, the ONT further having a logical test port accessible to the test host and not corresponding to any physical port of the ONT, the ONT further selectably providing a data communication path between the logical test port and the logical user port.

9. The PON claimed in claim 8, wherein each logical user port and the logical test port is accessible by a corresponding Gigabit PON (GPON) Encapsulation Method (GEM) Port Identifier (GEM Port-ID).

10. The PON claimed in claim 8, wherein the data communication tunnel is defined by a virtual local area network (VLAN).

11. The PON claimed in claim 8, wherein the data communication tunnel is defined by multi-protocol label-switching (MPLS).

* * * * *